United States Patent
Dagdeviren et al.

(10) Patent No.: US 6,519,291 B1
(45) Date of Patent: Feb. 11, 2003

(54) REDUCTION OF INTERFERENCE IN DISCRETE MULTI-TONE (DMT) BASED COMMUNICATIONS SYSTEMS

(75) Inventors: Nuri Ruhi Dagdeviren, Red Bank, NJ (US); George John Kustka, Marlboro, NJ (US); Rajiv Laroia, Princeton Junction, NJ (US); Jin-Der Wang, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/017,592

(22) Filed: Feb. 3, 1998

(51) Int. Cl.[7] .................................................. H04J 1/00
(52) U.S. Cl. ....................... 375/260; 375/358; 370/201; 370/295; 370/485; 455/69
(58) Field of Search .................................. 375/222, 260, 375/285, 356, 358; 370/201, 503, 508, 295, 485; 455/69

(56) References Cited

U.S. PATENT DOCUMENTS 6,144,695 A * 11/2000 Helms et al. ................ 370/201
6,285,654 B1 * 9/2001 Marchok et al. ............ 370/208

* cited by examiner

*Primary Examiner*—Amanda T. Le

(57) ABSTRACT

An Asymmetric Digital Subscriber Loop (ADSL) Discrete Multi-Tone system has disjoint and adjacent upstream and downstream channels. During the training phase of an ADSL connection, an ADSL DMT transmitter first determines a round trip propagation delay by transmitting a ranging signal to a far-end ADSL endpoint. During the subsequent communications phase, the ADSL transmitter synchronizes transmission of DMT symbols to a reference clock. In addition, the cyclic extensions of each DMT symbol are increased as a function of the propagation delay.

58 Claims, 14 Drawing Sheets

CE gate detector for extracting a DMT symbol

Prior Art

REDUCTION OF INTERFERENCE IN DISCRETE MULTI-TONE (DMT) BASED COMMUNICATIONS SYSTEMS

FIELD OF THE INVENTION

This invention relates generally to communications and, more particularly, to high-speed data communications systems.

BACKGROUND OF THE INVENTION

Plain Old Telephone Service (POTS) is typically deployed to individual subscribers over a twisted pair of wire. Today, in addition to voice services, more and more subscribers want high-speed data access to, e.g., the Internet, over this twisted pair. One technology that increases the transmission capacity over a twisted pair is Asymmetric Digital Subscriber Loop (ADSL). One version of ADSL increases the bandwidth of the twisted pair up to 1.1 Mhz (megahertz), which provides transmission capabilities up to 9 Mbps (millions of bits per second).

ADSL allocates different amounts of bandwidth between upstream communications and downstream communications (hence the term "asymmetric"), with upstream communications having less bandwidth than downstream communications. In this context, there are different strategies for specific bandwidth allocation and different modulation methods available. For example, in the upstream direction, i.e., from a subscriber's consumer premises equipment (CPE) to a central office (CO) (or local exchange carrier (LEC)) the upstream channel may have an allocated bandwidth from 25 Khz (kilohertz) to 138 Khz; while in the downstream direction, i.e., from the CO to the CPE, the downstream channel may have an allocated bandwidth from 138 Khz to 1.1 Mhz. (The POTS voice channel (0 to 4 Khz) is unaffected by ADSL.). In this example, the upstream channel and downstream channel are disjoint and also adjacent. However, ADSL systems can be constructed where the upstream channel partially overlaps with the downstream channel. While this provides more bandwidth for the downstream signal, this also requires the use of echo cancellation techniques. Turning to modulation methods, carrierless amplitude phase (CAP) modulation or Discrete Multi-Tone (DMT) modulation can be used. (DMT is a form of orthogonal frequency division multiplexing (OFDM).)

One standard for ADSL transmission is ANSI T1.413. This standard specifies the use of DMT modulation, which utilizes multiple carriers (also sometimes referred to as subcarriers) for conveying information. In DMT modulation, the allocated frequency range is divided into K carrier channels, K>1, each carrier channel separated by approximately 4 Khz. In such an approach, a DMT-based ADSL system transmits what is referred to as "multi-tone symbols" or "DMT symbols."

One problem in an ADSL DMT-based system is the complexity, and resulting system cost, of echo cancellation if there is an overlap between the upstream channel and the downstream channel. This complexity is due to the fact that each carrier may be interfered with by a plurality of the other carriers. Consequently, it is cheaper to offer ADSL systems in which the upstream channel and the downstream channel are disjoint.

Another problem in an ADSL DMT-based system is that there may be intersymbol interference (ISI), i.e., adjacent DMT symbols interfering with each other. To reduce the effect of ISI, the concept of "cyclic extension" is used. In cyclic extension, a DMT symbol is partially, and cyclically, extended in both directions. A conceptual illustration is shown in FIG. 1 for a single carrier at a receiver. The DMT symbol is represented by, e.g., the phase of carrier 10. Cyclic extension occurs before and after the DMT symbol. Essentially, carrier 10 is allowed to extend in both directions as represented by cyclic extension 1 ($CE_1$) and cyclic extension 2 ($CE_2$), which may or may not be equal to each other. $CE_1$ and $CE_2$ are a form of overhead in DMT transmission and are also known in the art as the prefix and the postfix, respectively. It should be noted that in practice an ADSL DMT transmitter simply adds a single cyclic extension, CE, to the DMT symbol, as shown in FIG. 1; while the receiver adjusts the sampling process such that, two apparent cyclic extensions, a $CE_1$ and $CE_2$ result, where $CE=CE_1$ and $CE_2$. As used herein, the term extended DMT symbol includes the DMT symbol plus at least one cyclic extension. The value of CE is adjusted as a function of the span of an estimated channel impulse response.

SUMMARY OF THE INVENTION

We have observed that in a DMT-based system using the above-mentioned cyclic extensions and having disjoint and adjacent upstream and downstream channels, interference may still occur between different carriers of the upstream channel and the downstream channel. However, we have realized that synchronization of DMT symbol transmissions reduces this interference. Therefore, and in accordance with the invention, a multi-tone transmitter is synchronized with a far-end multi-tone transmitter. Additionally, we have realized that such synchronization simplifies the design of an echo canceler, which can be used in multi-tone systems where the upstream channel and downstream channel overlap. (Even in the case of using disjoint and adjacent upstream and downstream channels, echo cancellation may also be needed due to the roll-off in the excess bandwidth expansion in the upstream channel if the upstream signal is generated using an inverse fast Fourier transform of a size equal to the number of carriers in the signal.)

In an embodiment of the invention, an ADSL DMT system has disjoint and adjacent upstream and downstream channels. During the training phase of an ADSL connection, an ADSL DMT transmitter first determines a round trip propagation delay by transmitting a ranging signal to a far-end ADSL endpoint. During the subsequent communications phase, the ADSL transmitter synchronizes transmission of DMT symbols to a reference clock. In addition, the cyclic extensions of each DMT symbol are increased as a function of the propagation delay.

In a second embodiment of the invention, an ADSL DMT system has an upstream and downstream channel that partially overlap. During the training phase of an ADSL connection, an ADSL DMT transmitter first determines a round trip propagation delay by transmitting a ranging signal to a far-end ADSL endpoint. During the subsequent communications phase, the ADSL transmitter synchronizes transmission of DMT symbols to a reference clock. In addition, the cyclic extensions of each DMT symbol are increased as a function of the propagation delay. An ADSL receiver includes a single tap echo canceler for each carrier in that portion of bandwidth where the upstream and downstream channels overlap.

DETAILED DESCRIPTION

Figure 1:
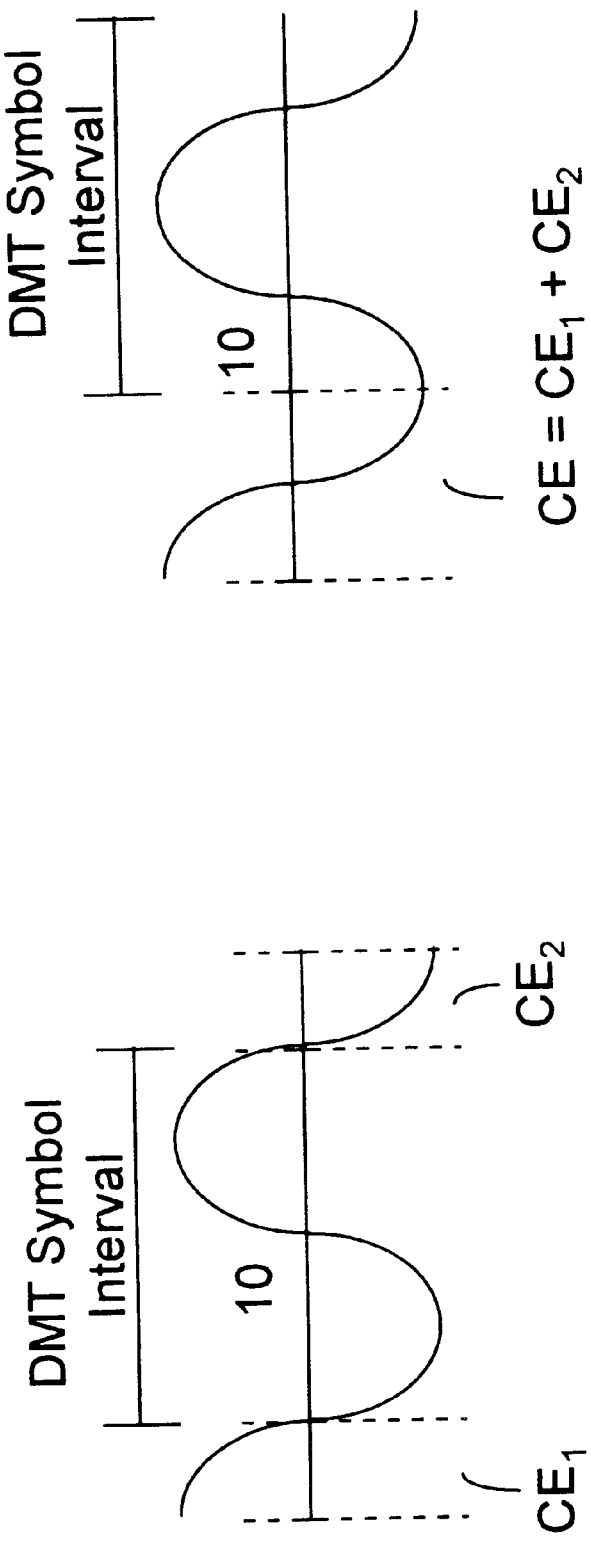
FIG. 1 conceptually illustrates cyclic extension as used in ADSL DMT transmission to compensate for ISI.
Figure 2:
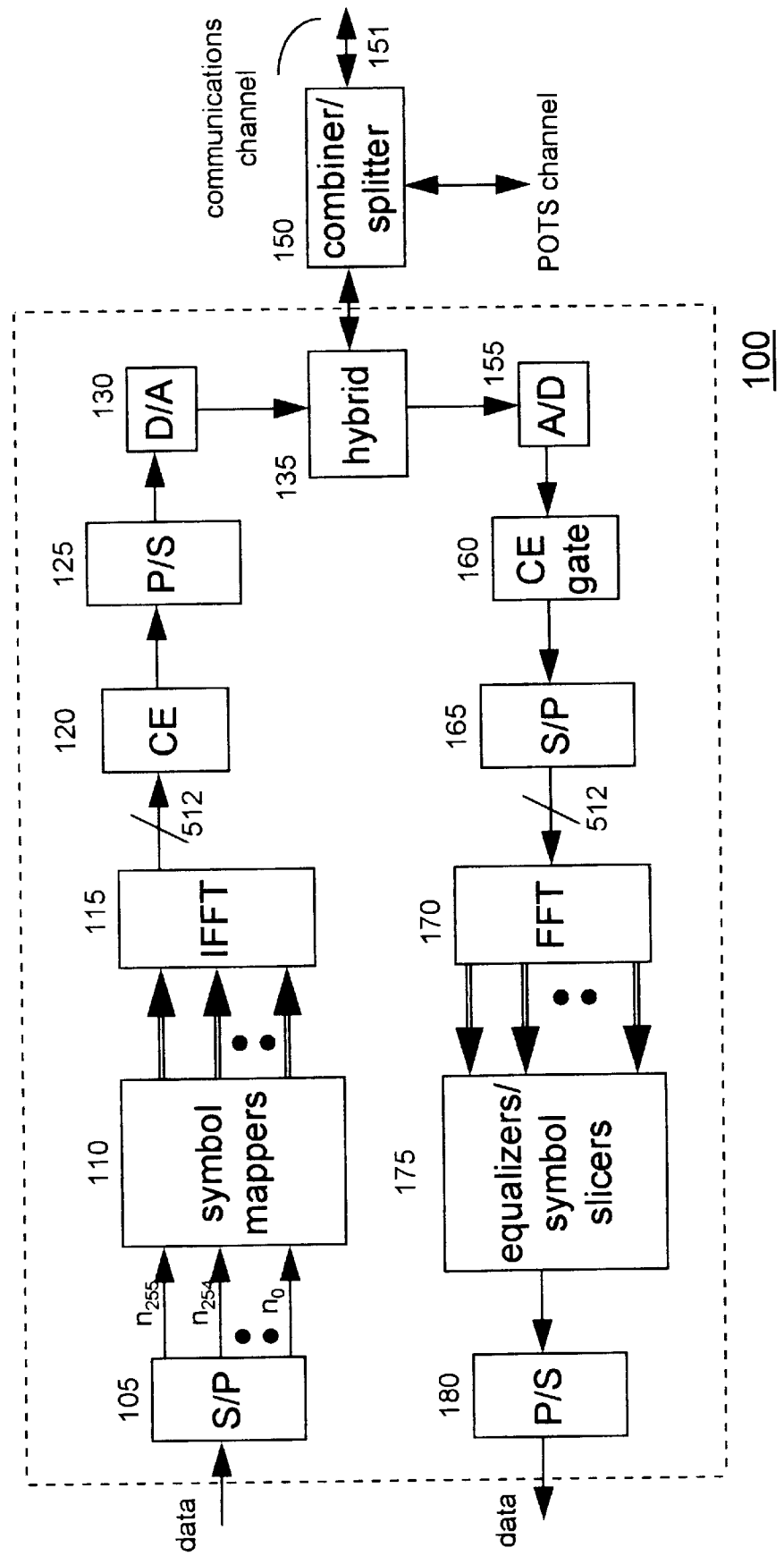
FIG. 2 illustrates prior art ADSL communications equipment.
Figure 3:
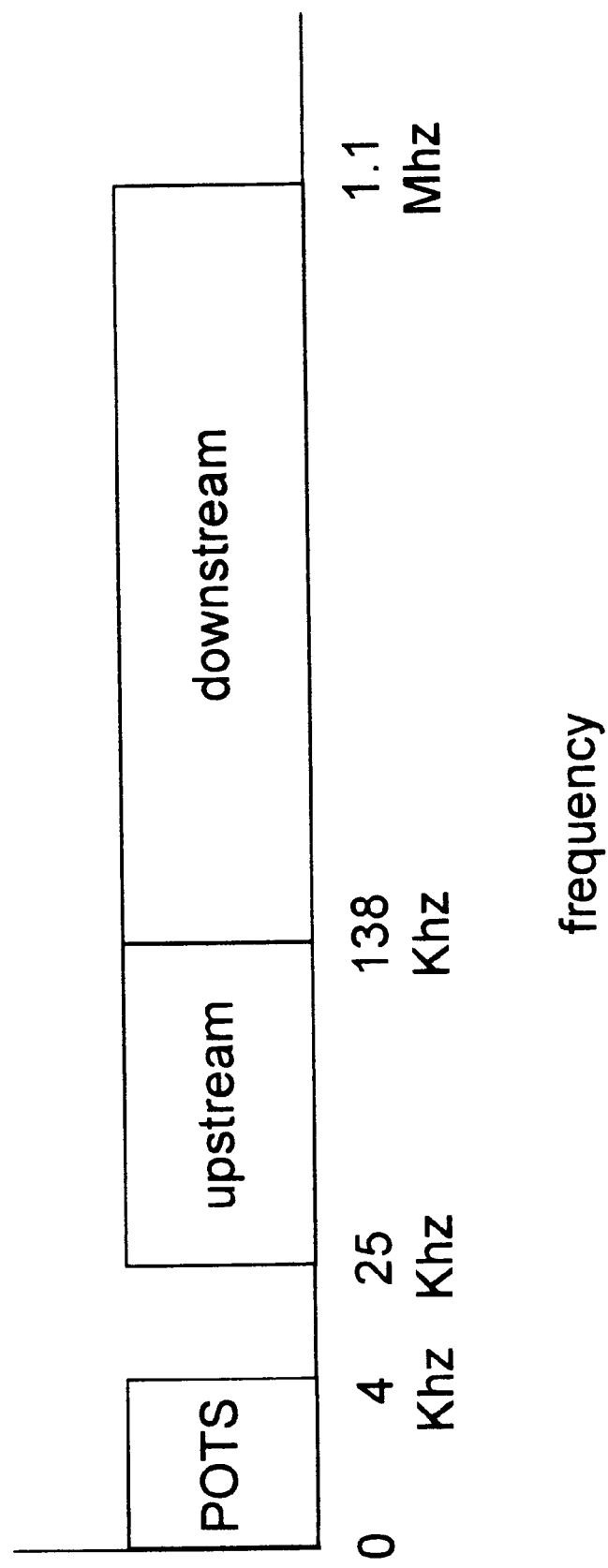
FIG. 3 shows an illustrative ADSL bandwidth allocation.

Before describing the inventive concept, prior art ADSL communications equipment 100, shown in FIG. 2, is described in order to provide some background information. The elements shown in FIG. 2 are well-known and will not be described in detail. For the purposes of description, it is assumed that ADSL equipment 100 is located at the CO. The corresponding ADSL equipment located at the subscriber's premise, i.e., the far-end ADSL equipment, or CPE, is similar and will not be described herein. It is assumed that ADSL equipment 100 conforms to ANSI T1.413. Also, it is assumed the ADSL system represented by FIG. 2 allocates bandwidth as shown in FIG. 3. The POTS channel is in the 0 to 4 Khz range, the upstream channel, i.e., from the CPE to the CO, is in the 25 Khz to 138 Khz; while the downstream channel, from the CO to the CPE, is in the 138 Khz to 1.1 Mhz range. As such, the upstream channel and downstream channel are disjoint and also adjacent.

Returning to FIG. 2, the transmitter portion of ADSL equipment 100 comprises serial-to-parallel converter (S/P) 105, symbol mappers 110, inverse fast Fourier transform element (IFFT) 115, cyclic extender (CE) 120, parallel-to-serial converter (P/S) 125, digital-to-analog converter (D/A) 130, and hybrid 135. A data signal is applied to S/P 105, which converts the data signal from serial to parallel form and provides 256 signals $n_0$ through $n_{255}$. Signals $n_0$ through $n_{255}$ are applied to symbol mappers 110. The latter comprises 256 symbol mappers, one for each of the parallel output signals of S/P 105. (As described further below, the number of bits encoded by each symbol mapper, and hence the number of bits S/P 125 provides in each $n_i$ is determined as a result of a spectral response determined during a training phase.) The resulting 256 output symbol streams from symbol mappers 110 are complex valued and are applied to IFFT 115, which modulates the various different carriers with the output symbol stream to provide 512 output signals. (IFFT 115 takes the complex conjugate (not shown) of the 256 output symbol streams to provide 512 real signals.) The 512 output signals from IFFT 115 are applied to CE 120, which performs the above-mentioned cyclic extension. These extended signals are then applied to P/S 125 to provide a serial output signal, the DMT symbol plus cyclic extender, that is converted from digital to analog by A/D 130. The latter provides a downstream ADSL signal representing a sequence of extended DMT symbols, to hybrid 135, which couples this downstream ADSL signal to combiner/splitter 150, which adds in the POTS channel. The output signal from combiner/splitter 150 comprises the POTS channel in the 0 to 4 Khz range and the downstream signal in the 138 Khz to 1.1 Mhz range and is applied to the communications channel, represented by twisted pair 151.

The receiver portion of ADSL equipment 100 comprises hybrid 135, analog-to digital converter (A/D) 155, CE gate 160, S/P 165, fast Fourier transform element 170, equalizer/symbol slicer 175, and P/S 180. Combiner/splitter 150 splits out the POTS channel from the signal present on twisted pair 151 and provides the remaining upstream ADSL signal (in the 138 Khz to 1.1 Mhz range) to hybrid 135. The latter couples the upstream ADSL signal to CE gate 160, which extracts DMT symbols from each received extended DMT symbol, as known in the art. (It should be noted that the function of CE gate 160 could alternatively be performed after S/P 165.)

Figure 4:
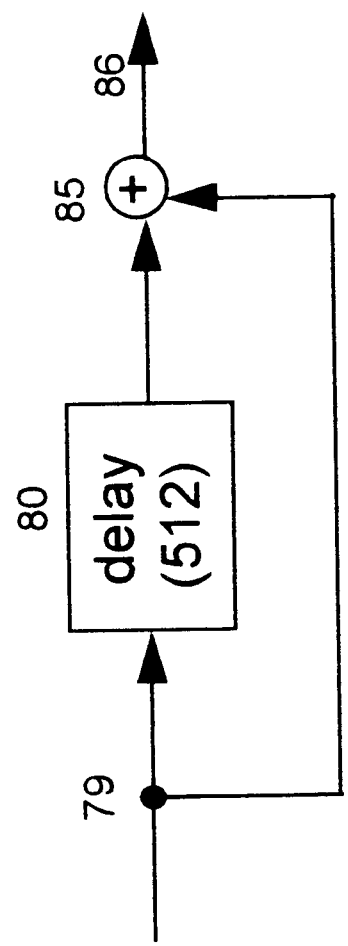
FIG. 4 shows an illustrative CE gate detector element of CE gate 160 of FIG. 2.

One function of CE gate 150 is to determine when to begin the extraction process. An illustrative structure for use within CE gate 150 is shown in FIG. 4. A signal 79, representing extended DMT symbols, is applied to delay element 80 and combiner 85. Delay element 80 in combination with combiner 85 allows comparison of a current sample with the value of the sample that occurred 512 points earlier. Combiner 85 provides a signal indicative of when in the extended DMT symbol the extraction process can being, i.e., what possible 512 samples represent the DMT symbol.

Returning to FIG. 2, the output signal from CE gate 160 is applied to S/P 165, which provides 512 output signals to FFT 170 which recovers the symbols from each of the carriers. Equalizers/symbol slicers 175 represents a plurality of equalizer and symbol slicer structures, one for each carrier for recovering the data signal in parallel form. The output signals of equalizers/symbol slicers 175 are applied to P/S 180 for converting the data signal back into serial form.

Figure 5:
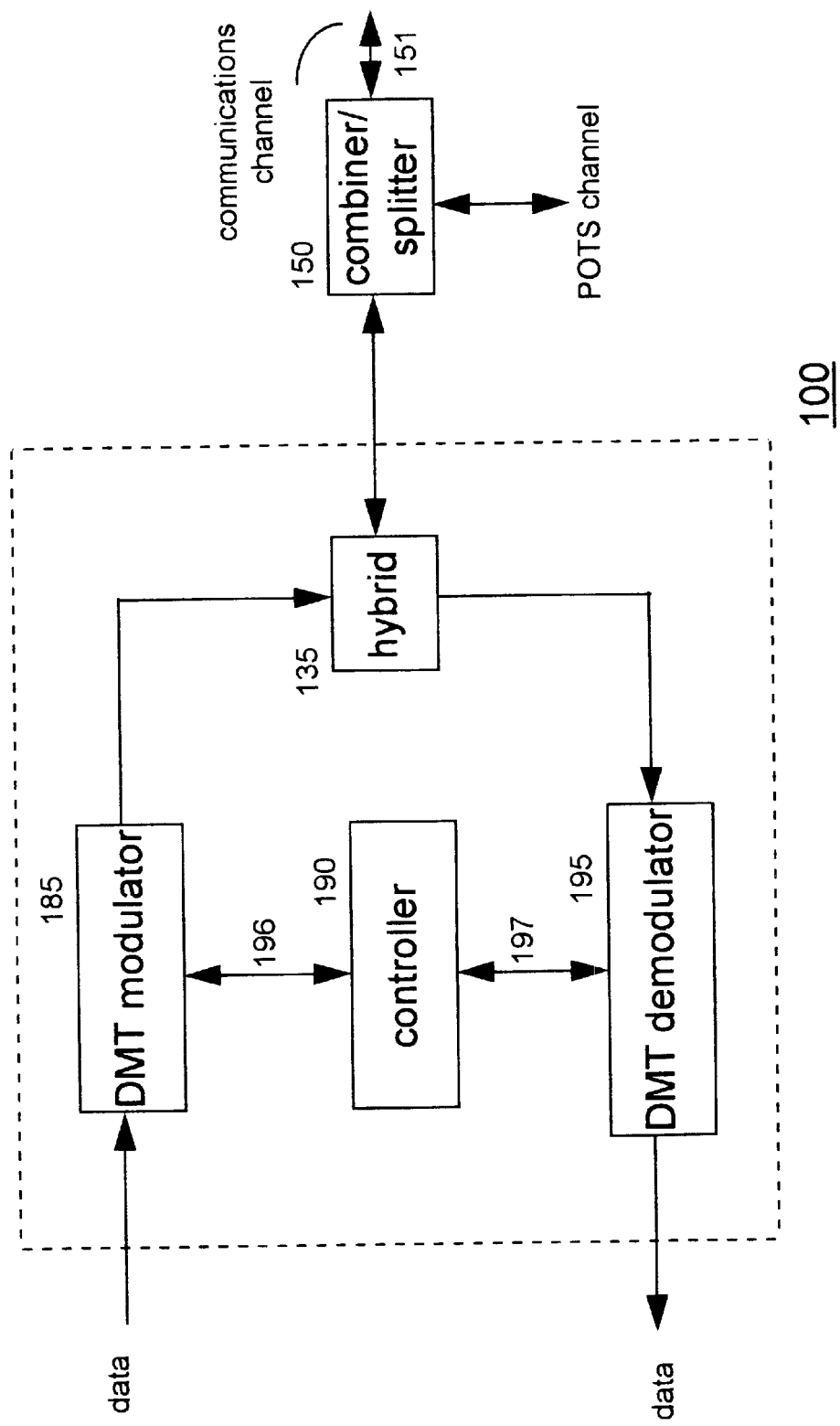
FIG. 5 illustrates another representation of prior art ADSL communications equipment.

An alternative representation of prior art ADSL equipment is shown in FIG. 5. It should also be noted that like numbers in different figures are similar elements. ADSL equipment 100 is shown in FIG. 5 as comprising DMT modulator 185, DMT demodulator 195, hybrid 135, and controller 190. DMT modulator 185 operates as described above with respect to transmission of an ADSL signal and includes the above-mentioned components of FIG. 2 such as S/P 105, etc. Similarly, DMT demodulator 195 operates as described above with respect to reception of an ADSL signal and includes the above-mentioned components of FIG. 2 such as A/D 155, etc.

Also shown in FIG. 5 is controller 190, which is illustratively a stored-program controller and associated memory as known in the art. Controller 190 controls and receives information from DMT modulator 185 and DMT demodulator 195, via signaling 196 and 197, respectively. Generally speaking, an ADSL communications session comprises a training phase and a communications phase. During training, ADSL equipment 100 exchanges signaling with the far-end ADSL equipment (not shown). Controller 190 uses this signaling to establish the above-mentioned spectral response of communications channel 151 (as does a similar controller in the far-end ADSL equipment). The spectral response is affected by such items as cross-talk, physical loop length of the twisted pair of communications channel 151, etc. To determine the spectral response of the twisted pair, controller 190 generally performs the following steps. First, DMT modulator 185 transmits a wide band test signal to the far-end ADSL equipment. Upon receipt, the far-end ADSL equipment evaluates the received signal to determine the spectral response of the twisted pair. Once the spectral response is determined, the far-end ADSL equipment generates a bit loading table and sends the bit loading table to ADSL equipment 100. The bit loading table includes, for each carrier, a number of bits that each carrier can support. The bit loading table is used by controller 190 to select various operating parameters such as symbol mappings at each carrier. (Although each carrier can support up to M bits of information, the actual amount of bits a carrier supports varies due to the spectral response of the twisted pair at the different carrier frequencies. For example, one carrier may be able to accommodate 12 bits while another may be only able to accommodate 2 bits.) Once the training phase is complete, transmission can begin, i.e., the ADSL communications session enters the communications phase.

As shown above, ADSL equipment 100 is coupled to twisted pair 151 through hybrid 135 (ignoring for the moment combiner/splitter 150). During transmission and reception of DMT symbols (with associated cyclic extensions), we have observed that in a DMT-based system using the above-mentioned cyclic extensions and having disjoint and adjacent upstream and downstream channels, interference may still occur between different carriers of the upstream channel and the downstream channel. This interference occurs in a region about which the upstream and downstream channels are adjacent. For example, as shown in FIG. 3 the upstream channel and the downstream channel are adjacent at 138 Khz. For a range of frequencies around 138 Khz an upstream carrier may be interfered with by downstream carrier, and vice versa. (The range and magnitude of this type of interference is channel specific, i.e., is dependent on the above-mentioned spectral response)

Figure 6:
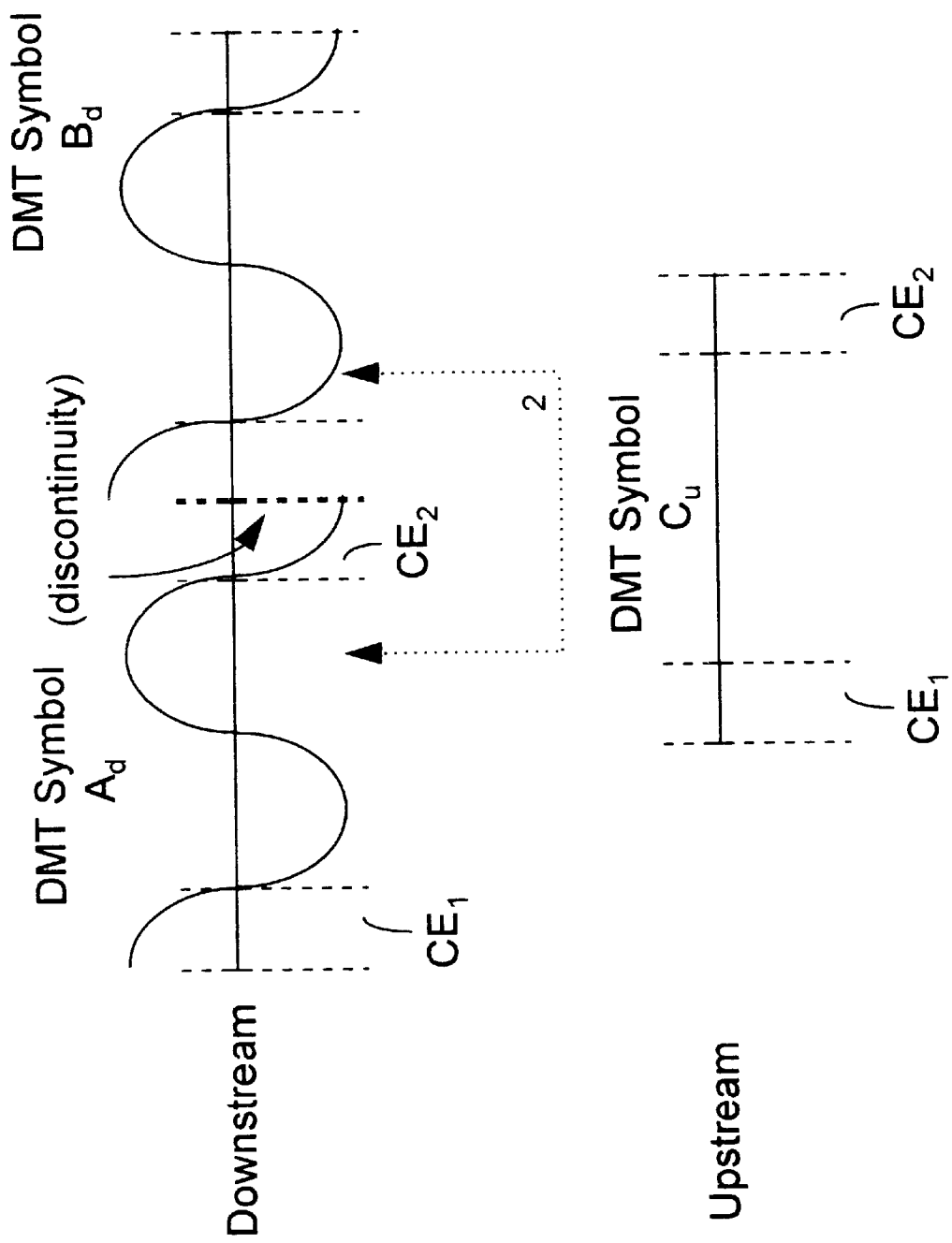
FIGS. 6 and 7 conceptually illustrate a form of interference in ADSL communications.
Figure 7:
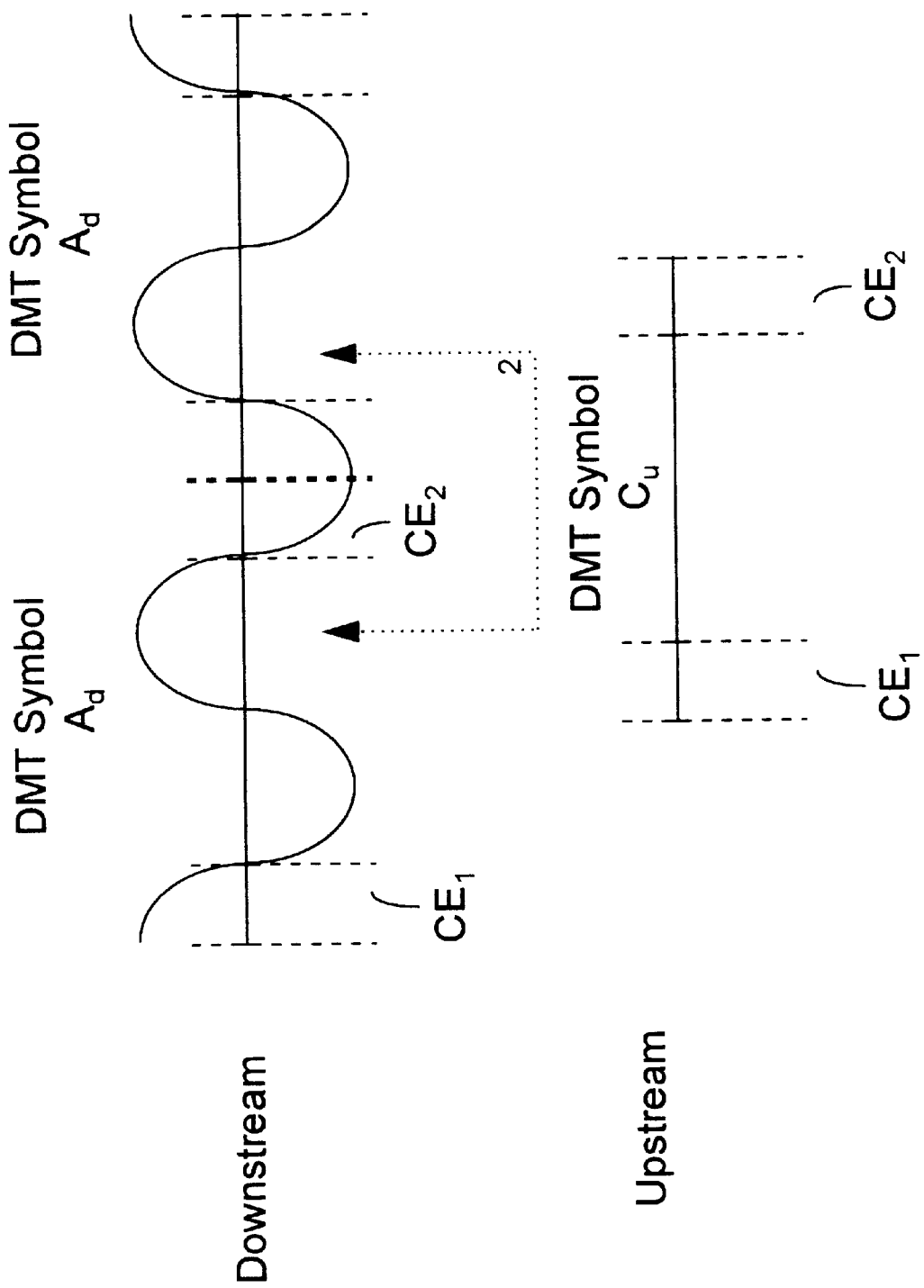

This is conceptually shown in FIGS. 6 and 7 for two different cases. In FIG. 6, in the downstream direction different DMT symbols $A_d$ and $B_d$ are consecutively transmitted by, e.g., DMT modulator 185 of FIG. 5. In the upstream direction, and in the period of time that DMT modulator 185 is transmitting DMT symbols $A_d$ and $B_d$, DMT symbol $C_u$ is received by hybrid 135. (For simplicity, it is assumed that DMT symbol $B_d$ is simply a phase reversal from DMT symbol $A_d$.) Hybrid 135 provides received upstream DMT symbol $C_u$, and a portion of the downstream transmission due to leakage, to DMT demodulator 195. This leakage signal not only includes the carriers represented by DMT symbols $A_d$ and $B_d$, but also additional noise. In particular, since the downstream transmission includes two different carrier symbols, there is a discontinuity between the symbols as shown in FIG. 6. This discontinuity results in additional frequency components being generated (this can be mathematically shown)—frequency components that can now appear in the upstream direction notwithstanding the use of disjoint frequency bands. (A similar effect is possible for the far-end ADSL endpoint with respect to upstream transmissions leaking into the downstream signal.) In particular, in order to recover DMT symbol $C_u$, the processing performed by DMT Demodulator 195 spans a period of time represented by dotted bracket 2, which includes both DMT symbol $A_d$, DMT symbol $B_d$, and the above-mentioned discontinuity. (With respect to the downstream signal shown on FIG. 6, it should be remembered that although shown as two separate cyclic extensions $CE_1$ and $CE_2$ for the purposes of this explanation, in practice a single cyclic extension CE is added by the transmitter, where $CE=CE_1+CE_2$. A similar comment is applicable for the downstream signal in FIGS. 7–10.)

In comparison, FIG. 7 illustrates the case when there is no discontinuity between consecutive DMT symbols. In FIG. 7, in the downstream direction the same DMT symbol $A_d$ is consecutively transmitted by, e.g., DMT modulator 185 of FIG. 5. In the upstream direction, and in the period of time that DMT modulator 185 is transmitting DMT symbols $A_d$, DMT symbol $C_u$ is received at hybrid 135. The latter provides received upstream DMT symbol $C_u$, and a portion of the downstream transmission due to leakage, to DMT demodulator 195. Now, as can be seen by reference to the dotted bracket 2 of FIG. 7, this leakage only includes the carriers represented by DMT symbol $A_d$ and, therefore, there is no discontinuity as between the consecutive downstream DMT symbols. Since these downstream carriers are disjoint in frequency from the upstream carriers, there is no effect on the received upstream transmission.

One method of removing the above-described interference is to use a filter in the receiver, e.g., a low pass filter (LPF) for ADSL equipment that is receiving the upstream signal. Unfortunately, this filtering may significantly increase the effect of envelope delay distortion on the received ADSL signal and thus the value of the cyclic extension.

However, we have realized that synchronization of DMT symbol transmissions also reduces this interference. Therefore, and in accordance with the invention, an ADSL transmitter is synchronized with a far-end ADSL transmitter. Additionally, we have realized that such synchronization simplifies the design of an echo canceler, which can be used in ADSL systems where the upstream channel and downstream channel overlap.

Figure 8:
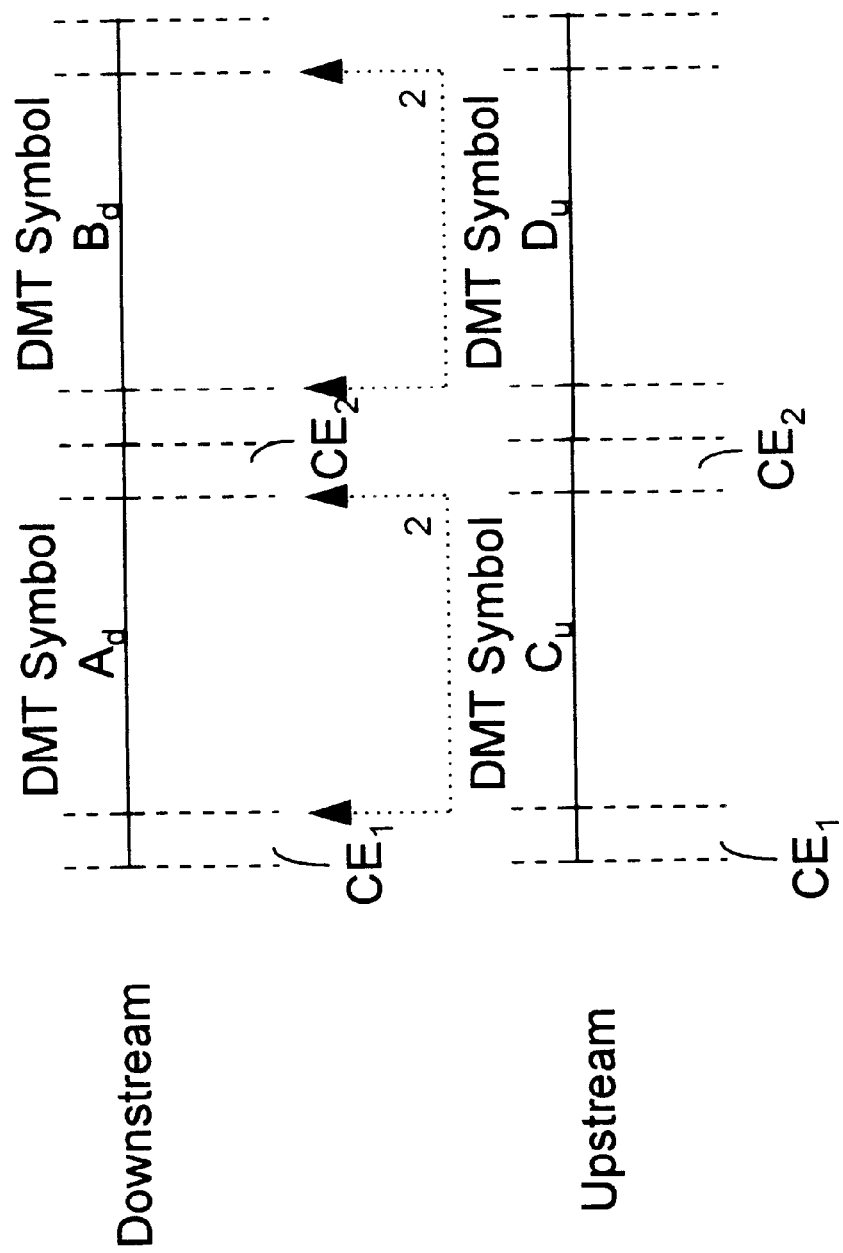
FIGS. 8–10 illustrate the inventive concept.
Figure 9:
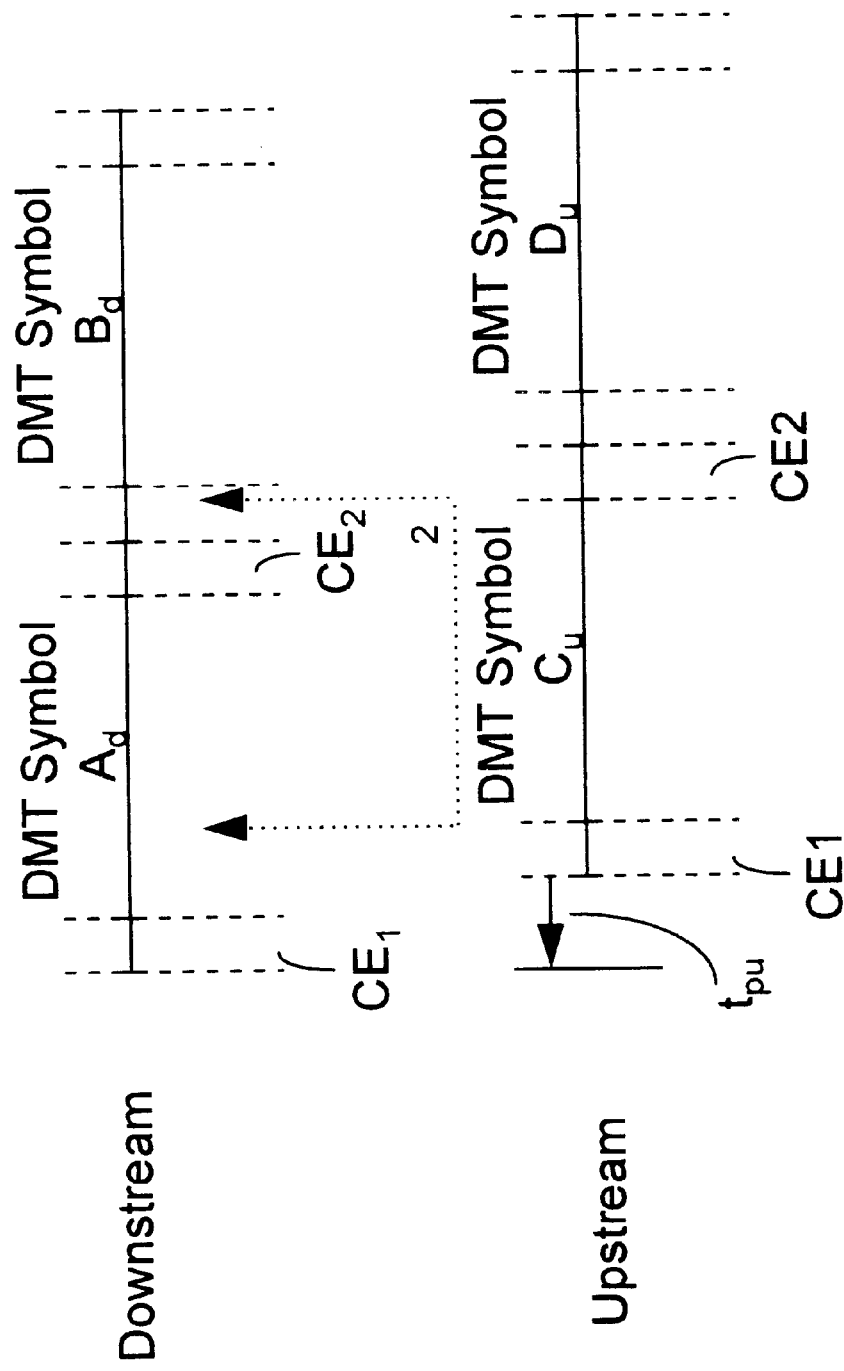
Figure 10:
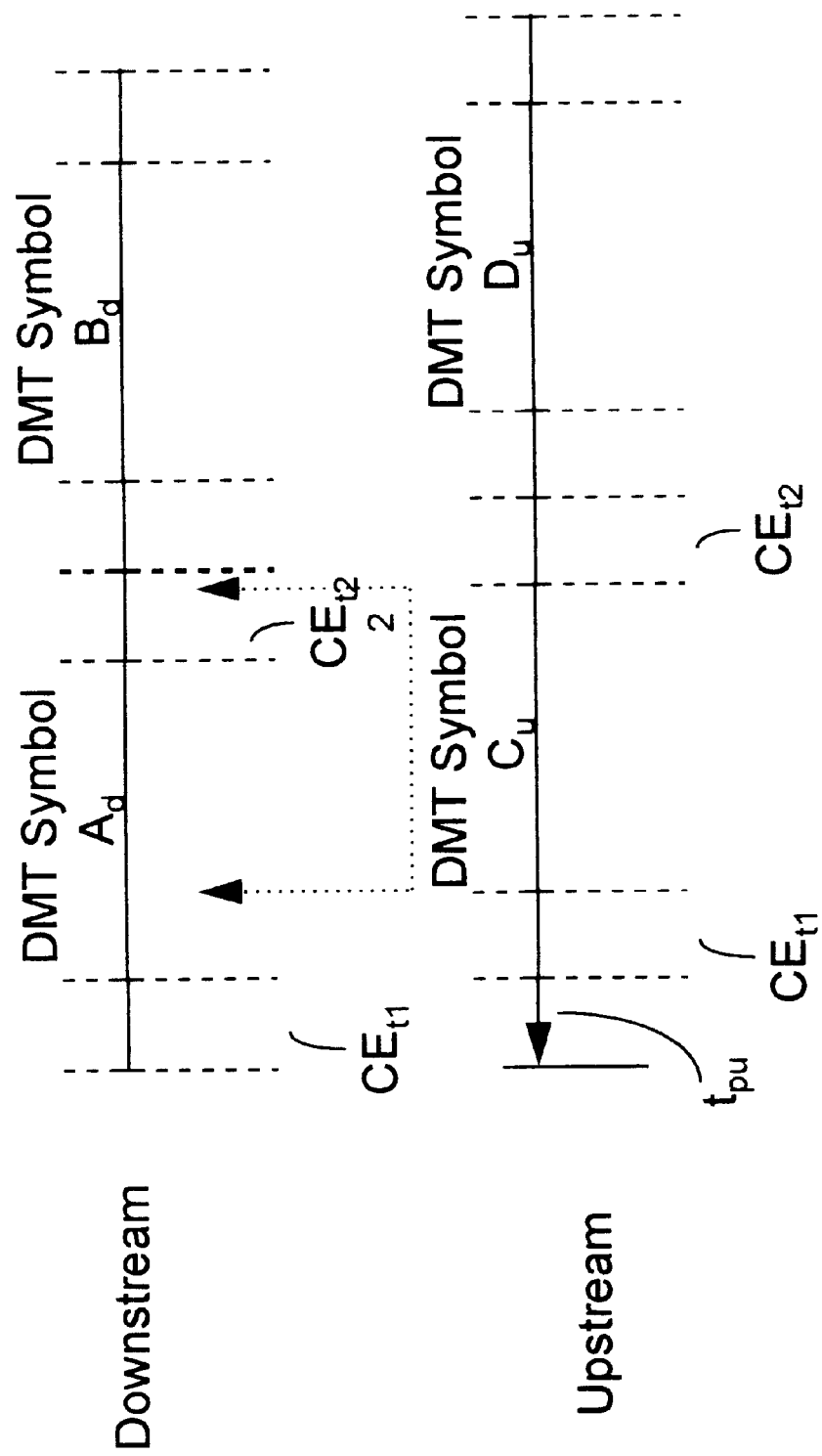

The inventive concept is shown in FIGS. 8–10. The latter are explained in the context of ADSL equipment located in the CO. A similar description applies to the ADSL CPE and is not described herein. The effect of synchronization of ADSL transmitters assuming zero, or negligible, propagation delay is shown in FIG. 8. In the downstream direction different DMT symbols $A_d$ and $B_d$ are consecutively transmitted by the ADSL CO equipment. At the same time, and in the upstream direction, the ADSL CO equipment receives DMT symbols $C_u$ and $D_u$. Although there is leakage through the hybrid of the ADSL CO equipment of the downstream transmission signal, the processing for each received DMT symbol only spans a single downstream DMT symbol as can be seen by the dotted brackets 2.

In comparison, FIG. 9 shows the effect of a noticeable upstream propagation delay, $t_{pu}$. It can be observed from FIG. 9 that the upstream propagation delay, for some values, can still cause an ADSL received DMT symbol to be affected by more than one transmitted DMT symbol via leakage. (This is shown by dotted brackets 2 of FIG. 9.) Therefore, and in accordance with the principles of the invention, for some ADSL systems the cyclic extension is increased in value as a function of the propagation delay of the ADSL system to maintain synchronization. This additional cyclic extension delay can be added in a number of different ways.

One method is simply to add a fixed amount of cyclic extension independent of the propagation delay.

Another method is shown in FIG. 10, where each cyclic extension is now equal to:

$$CE_{t1}=CE_1+\alpha t_{pu}, \qquad (1)$$

and $$CE_{t2}=CE_2+(1-\alpha)t_{pu}, \qquad (2)$$

where $CE_{t1}$ and $CE_{t2}$ are the new values for each cyclic extension taking into account a time delay, denoted by the subscript t, $CE_1$ and $CE_2$ are the values of the respective original cyclic extension used to compensate for the above-mentioned ISI interference, and $t_{pu}$ is a measured value of the upstream propagation delay denoted by the subscript pu. FIG. 10 illustratively shows a value of $\alpha=0.5$. Consequently, from FIG. 10, the total cyclic extension value is $$\text{total cyclic extension value} = CE_1 + CE_2 + t_{pu}. \quad (3)$$

In general, in this approach, the round trip delay is used to determine the new value for the total cyclic extension, $CE_T$, with respect to a propagation delay in accordance with the principles of the invention, where, $$CE_T = (t_{pu} + t_{pd})/2, \quad (4)$$

and $$\text{total cyclic extension value} = CE_i + CE_T. \quad (5)$$

where $CE_i$ is the total value of the cyclic extension used to compensate for the above-mentioned ISI interference (e.g., the previous $CE_1+CE_2$), denoted by the subscript i, $t_{pd}$ is a measured value of the downstream propagation delay denoted by the subscript pd, and where the round trip delay is equal to $(t_{pu}+t_{pd})$.

Under conditions when the upstream propagation delay equals the downstream propagation delay, the cyclic extension can simply be increased in accordance with equation (5). However, in some situations, these delays may not be equal, and increasing the value of the cyclic extensions may not be enough to maintain synchronization. In these situations, the ADSL endpoint that is slaved to the opposite endpoint (described below), should also delay transmission of each DMT symbol by a time delay, $\delta t$, where:

$$\delta t = [(t_{pd} + t_{pu})/2] - t_{pu}. \quad (6)$$

In addition to the above-described techniques for increasing the value of the cyclic extension to maintain DMT symbol synchronization, other equivalent techniques are also available. For example, simply turning on and turning off a transmitter as appropriate points in time. Where the tumon, turnoff, intervals are a function of the propagation delay.

Figure 11:
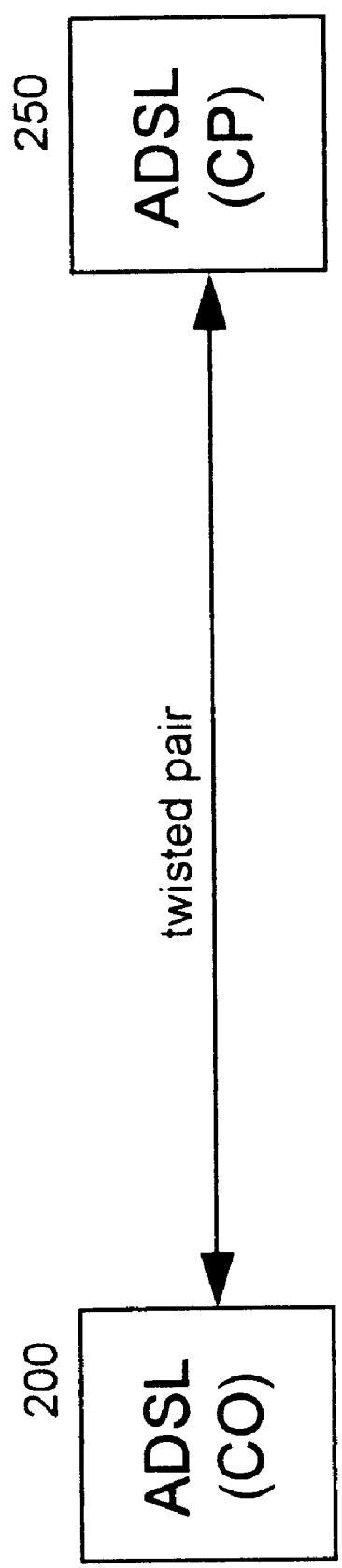
FIG. 11 shows an ADSL communications system in accordance with the principles of the invention.

An illustrative ADSL system embodying the principles of the invention is shown in FIG. 11. The ADSL system comprises ADSL CO equipment 200 coupled to ADSL consumer premise (CP) equipment 250 via a twisted pair. Each of these is also referred to as a multi-carrier endpoint. (The splitter/combiner for the POTS channel has been left out for simplicity.) It is assumed that the ADSL DMT system has disjoint and adjacent upstream and downstream channels. In accordance with the inventive concept, during the training phase of an ADSL connection, an ADSL DMT transmitter, located either within ADSL CO equipment 200 or ADSL CP equipment 250, first determines a round trip propagation delay by transmitting a ranging signal to a far-end ADSL endpoint. During the subsequent communications phase, each ADSL transmitter synchronizes transmission of DMT symbols to a reference symbol clock. In addition, the cyclic extensions of each DMT symbol may be increased as a function of the propagation delay.

Figure 12:
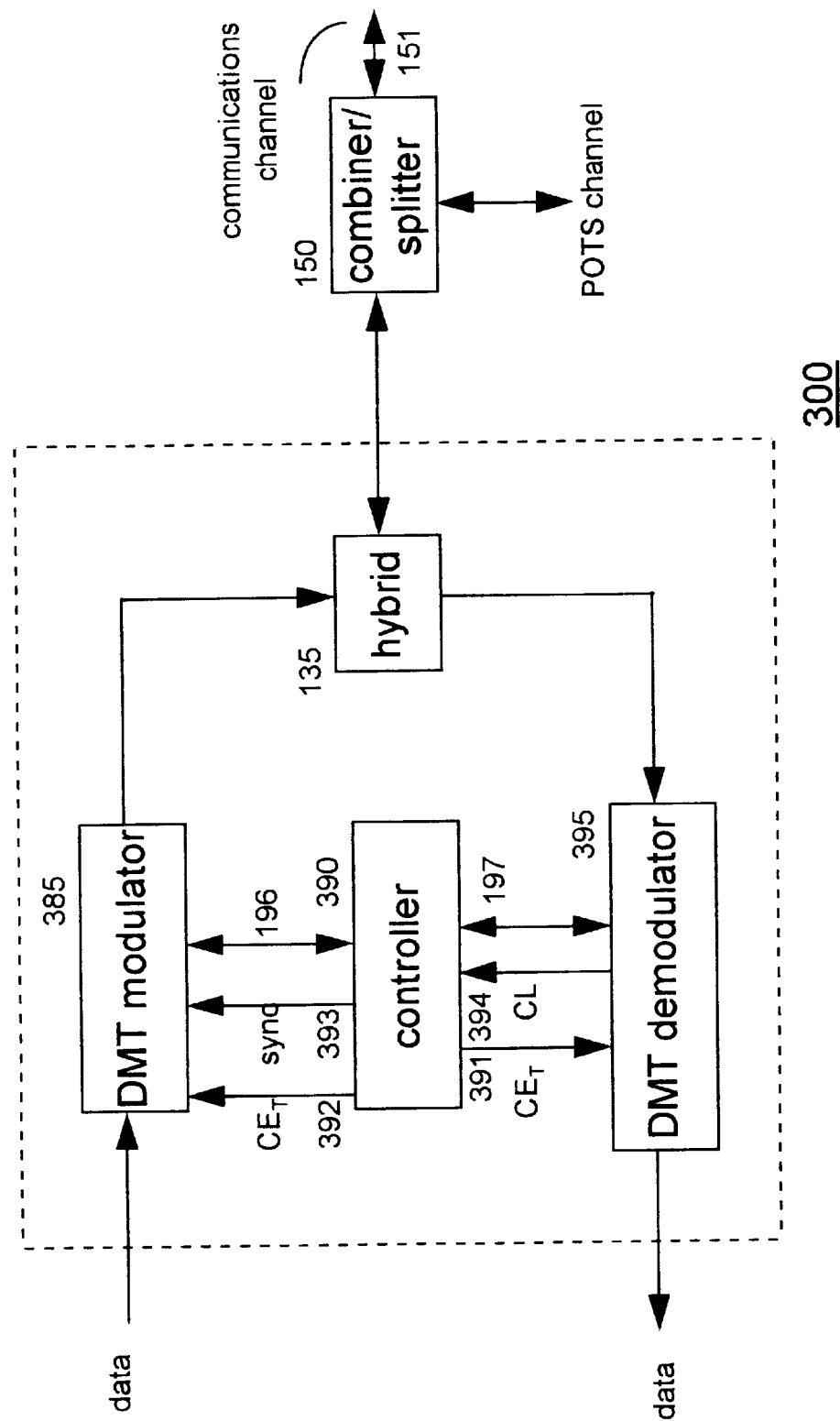
FIG. 12 shows ADSL equipment in accordance with the principles of the invention for use in the system of FIG. 11.

Illustrative ADSL equipment 300 embodying the principles of the invention for use in the ADSL system of FIG. 11 is shown in FIG. 12. Other than the inventive concept, the elements shown in FIG. 12 are well-known and will not be described in detail. (It should also be noted that like numbers in different figures are similar elements.)

DSL equipment 300 comprises DMT modulator 385, DMT demodulator 395, hybrid 135, and controller 390, which is illustratively a stored-program controller and associated memory as known in the art. DMT modulator 385 forms an ADSL signal for transmission on twisted pair 151 via hybrid 135 and combiner/splitter 150. DMT demodulator 395 recovers data from received ADSL signals provided by combiner/splitter 150 and hybrid 135. Controller 390 controls and receives information from DMT modulator 385 and DMT demodulator 395 via signaling 196 and 197, respectively.

In accordance with the inventive concept, controller 390 provides a synchronization, or sync, signal 393 to DMT modulator 385. While FIG. 12 shows a general architecture of ADSL equipment in accordance with the principles of the invention, the actual operation may differ depending on whether the ADSL equipment is located in the CO or the CP. It is assumed herein that the ADSL equipment located in the CO (e.g., ADSL CO equipment 200 of FIG. 11) is, e.g., a "master" and the ADSL equipment located in the CP is slaved to the CO equipment. In this case, when ADSL equipment 300 is located in the CO, sync signal 393 is not necessary, and DMT symbols are transmitted as before (although maybe with different cyclic extensions to achieve DMT symbol synchronization in accordance with the inventive concept, described below).

In the case when ADSL equipment 300 is located at the CP (e.g., ADSL CP equipment 250 of FIG. 11), controller 390 generates sync signal 393 using clock recovery information (CL) signal 394 provided by DMT demodulator 395. The CL signal 394 is already available within demodulator 385 from the CE gate element. The CE gate element provides, in effect, a recovered symbol clock since the CE gate element detects when to extract the DMT symbol, thereby removing the cyclic extensions, (e.g., as described above with respect to FIG. 4). As a result, DMT symbol generation is generated as a function of the recovered symbol clock and is slaved to the ADSL equipment in the CO. (It should be noted that system operation could also be opposite., i.e., the ADSL equipment in the CO being slaved to the ADSL CPE. In addition, other synchronization techniques may be used.)

In addition, as noted above, in some ADSL systems, the propagation delay may cause the loss of DMT symbol synchronization. In these systems, a number of alternative are possible.

One alternative is to increase the value of the cyclic extension as noted above. In one method of doing this, controller 390 provides a value for the $CE_T$, described above, to both DMT modulator 385 and DMT demodulator 395, via signaling 392 and 391, respectively. DMT modulator 385 modifies its respective cyclic extension element (not shown) to generate cyclic extensions having an additional duration of $CE_T$. Although provided to DMT demodulator 395 for the sake of completeness, the CE gate element does not require to know how the cyclic extender is partitioned. As noted above, the CE gate element extracts the DMT symbol using the best 512 samples within a received extended DMT symbol. Once the DMT symbol is extracted, the remaining portions of the extended DMT symbol are, by definition, the cyclic extender (prefix and postfix).

In one variation of this approach, controller 390 provides a fixed value for $CE_T$ to DMT modulator 385 and DMT demodulator 395 via signals 391 and 392.

In another variation of this approach, the value for $CE_T$ is determined during the above-mentioned training phase of an ADSL connection. While the value for $CE_T$ is the same in either ADSL equipment located at the CO or the CP, controller 390 generates this value differently depending on whether or not controller 390 is located in the CO or the CP. In the case when ADSL equipment 300 is located in the CO, controller 390 transmits, during training, a ranging signal (simply a predefined signal known to the far-end ADSL equipment). Upon receipt, the far-end ADSL equipment retransmits the ranging signal back to ADSL equipment 300. (Ranging techniques are known in the art and others may also be used.) Upon receipt of the ranging signal, controller 390 calculates the round trip propagation delay and determines a value for $CE_T$. (This calculated delay assumes negligible processing delay in the far-end ADSL equipment. If this processing delay is significant, the measured value in controller 390 must be adjusted for this processing delay.) Once calculated, this value of $CE_T$ is also transmitted to the far-end ADSL equipment for its use. (This is similar to the above-mentioned transmission of the bit-loading table). Other techniques could also be used, e.g., the ADSL located at the CP can generate the ranging signal, etc. (It should be realized, that those embodiments in which ADSL equipment 300 is located in the CP have already been described, i.e., in this case ADSL equipment 300 is the far-end ADSL, as described above.).

As noted above, in some situations, these propagation delays may not be equal, and increasing the value of the cyclic extensions may not be enough to maintain synchronization. In these situations, controller 390 additionally delays sync signal 393 by δt, from equation (6).

Another equivalent alternative is for controller 390 to control DMT modulator 385, e.g., by turning it on and off. In this case, controller 390 uses sync signal 393 to turn on, and off, DMT modulator 385. Here, sync signal 393 is a function of CL 394 and, if used, the increased cyclic extender value (whether fixed or as a function of a propagation delay). The latter generates the same effect as increasing the value of the cyclic extension. In this case, signal 392 is not necessary.

It should be noted that this additional signaling, CL signal 394, sync 393, etc., is shown to highlight the inventive concept. However, signaling 196 and 197 can also be suitably modified in accordance with the inventive concept.

Figure 13:
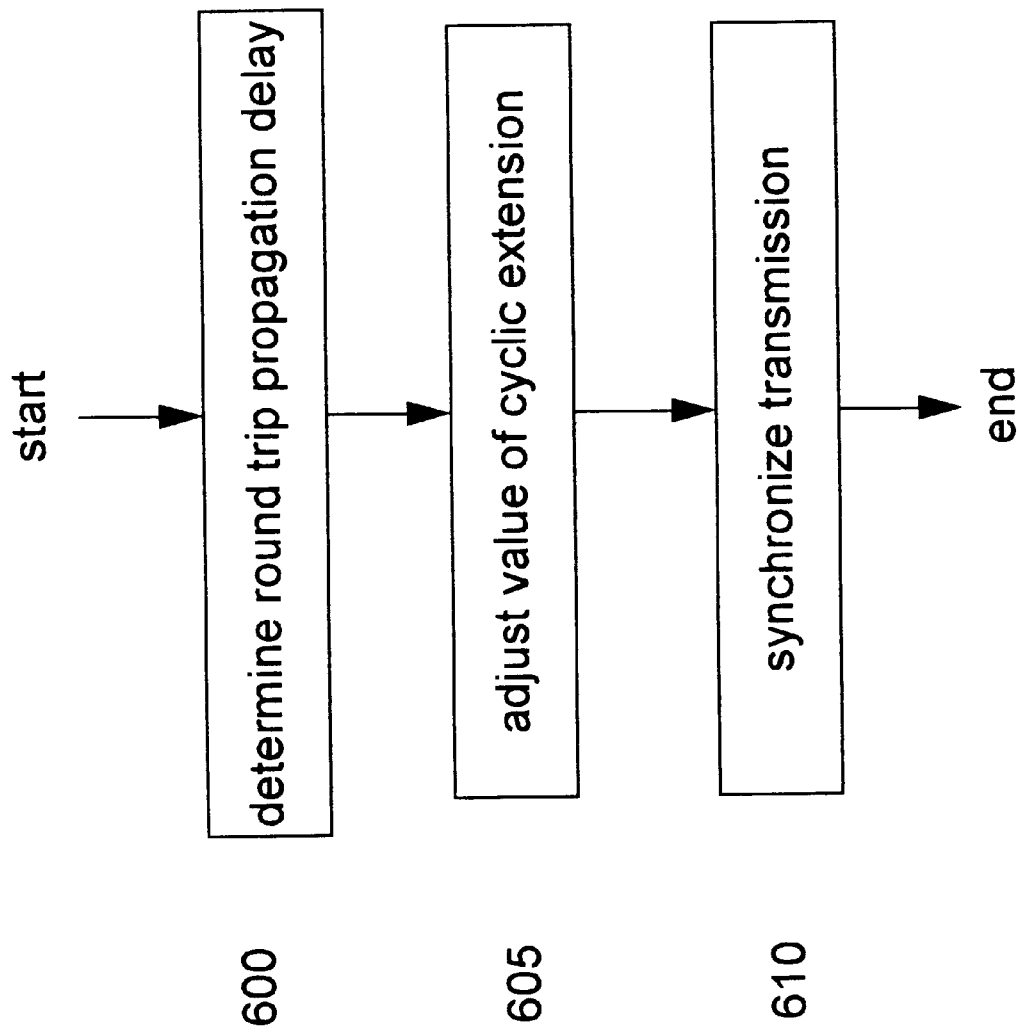
FIG. 13 shows an illustrative flow chart embodying the principles of the invention for use in the ADSL equipment of FIG. 12.

As noted above, in some cases, synchronization of the DMT symbols by use of the recovered symbol clock from the CE gate element is enough to provide DMT symbol synchronization in the ADSL system. In the worst case, a cyclic extension value must be increased (or equivalently increased). One such method is shown in FIG. 13. The latter shows an illustrative method in accordance with the principles of the invention for use in ADSL equipment, e.g., in controller 390 of FIG. 12. In step 600, controller 390 determines the round trip delay as described above. (As described above, the actual steps will vary depending on which end of the ADSL connection transmits the ranging signal.) In step 605, controller 390 adjusts the value of the cyclic extension as a function of the round trip delay and provides this value, $CE_T$, to both modulator 385 and demodulator 395. In step 610, controller 390 provides a synchronization, or sync, signal to DMT modulator 385. (It should be noted that ADSL equipment can dynamically determine when to use the method illustrated in FIG. 13 as, e.g., a function of the above-measured spectral response. If the results of this measurement are within a particular range, or over, or under a particular value, then performing the above-described method.)

Figure 14:
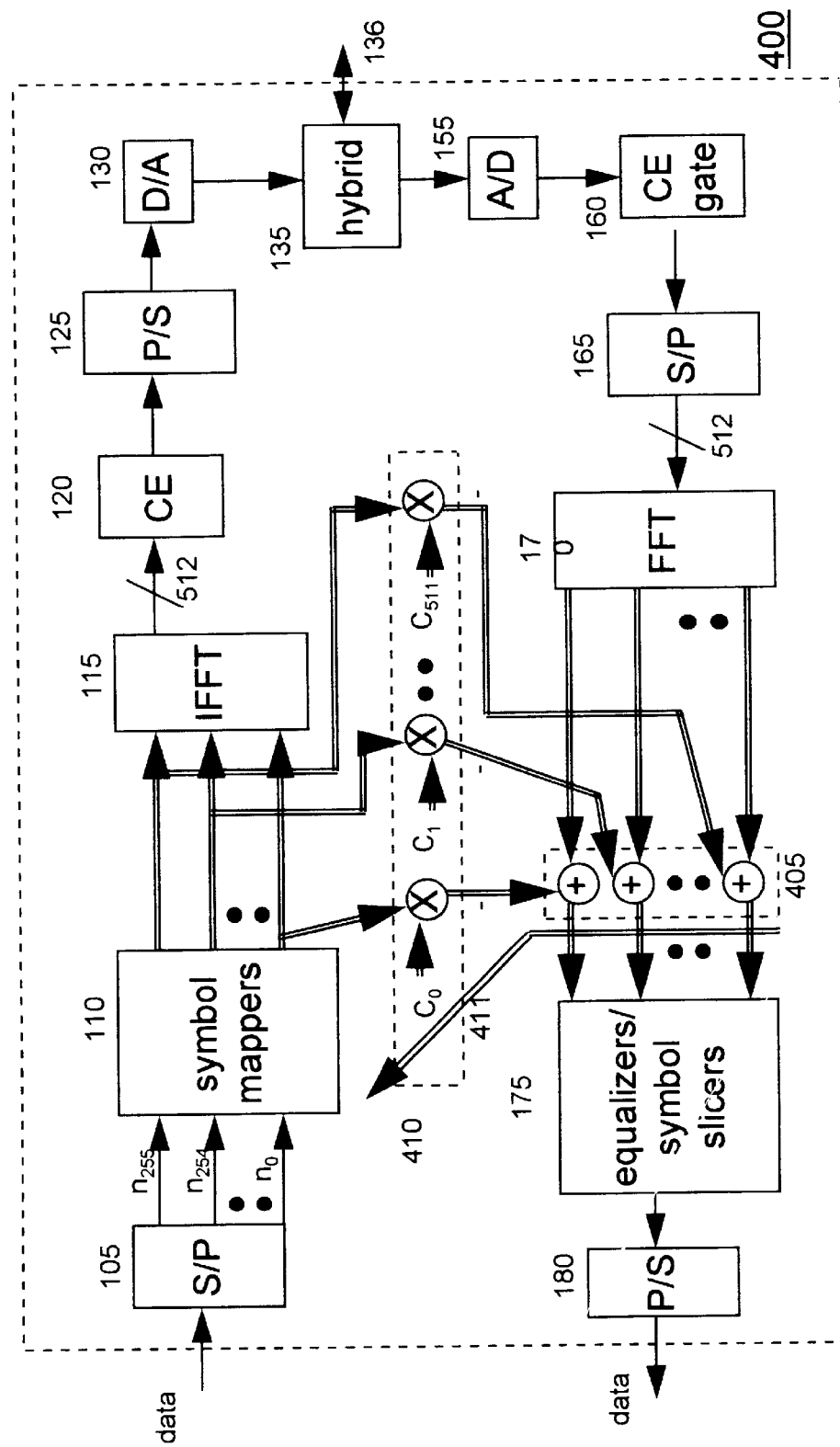
FIG. 14 shows ADSL equipment in accordance with the principles of the invention for use in the system of FIG. 11.

As noted above, in the instance when the downstream channel partially overlaps the upstream channel, echo cancellation is required. Typically, this echo cancellation is complex and, as a result, costly. However, and in accordance with the principles of the invention, an ADSL endpoint that is synchronized with an opposite ADSL endpoint can use a simpler—and cheaper—echo canceler. An illustrative ADSL equipment 400 is shown in FIG. 14.

In this embodiment of the invention, an ADSL DMT system has an upstream and downstream channel that partially overlap, e.g., the downstream channel can completely overlap the upstream channel. In this latter example, the downstream channel extends from 25 Khz to 1.1 Mhz. ADSL equipment 400 functions in a similar fashion to ADSL equipment 300 with respect to synchronization and modification of the cyclic extension as a function of round trip delay. In addition, ADSL equipment 400 includes a single tap echo canceler for each carrier in that portion of bandwidth where the upstream and downstream channels overlap.

The single tap echo canceler is represented by single tap adaptive filter 410, and combiner 405. Combiner 405 subtracts the estimates of the echo at each carrier frequency (some of which will be zero for those frequencies where there is no overlap of the upstream and downstream channel.) Adaptive filter 410 adapts the value of each coefficient $C_0$ through $C_{255}$ as a function of the respective output signal of combiner 405 as represented by feedback signal 411, as known in the art.

As noted above, by synchronizing the transmission of DMT symbols to the received DMT symbols, one is allowed to have a simplified echo canceler. Other variations are also possible, for example, in the case of CO ADSL equipment, when an upstream signal is processed in the receiver portion with an FFT size equal to the number of subcarriers in the upstream channel, the higher frequency carriers generated by the transmitter portion in the downstream channel can alias into the upstream signal. Therefore, one may want to use more than one downstream channel subcarrier in the echo canceler to cancel the interference in the upstream signal.

As described above, in accordance with the inventive concept an ADSL transmitter synchronizes DMT symbol transmission to received DMT symbols. As noted above, numerous variations are possible, such as performing additional training to yield a propagation delay, adding a value to the cyclic extension (this value being fixed or as a function of a propagation delay), and/or turning on and off the transmitter, etc. As such, the foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated herein as being implemented with discrete functional building blocks, e.g., DMT modulator; DMT demodulator, etc., the functions of any one or more of those building blocks can be carried out using one or more appropriately programmed processors, e.g., a digital signal processor, etc.

Also, although the inventive concept was illustrated using specific ADSL DMT bandwidth allocation schemes, the inventive concept is applicable to ADSL DMT in general including those versions that extend above 1.1 Mhz and symmetric DSL. Indeed, the inventive concept is applicable to any multi-tone communications system DSL or otherwise, e.g., a wireless system. In the latter, it should be noted that each multi-tone symbol may represent information from a plurality of subscribers, nevertheless, the inventive concept is still applicable.

What is claimed:

1. A method for use in multi-carrier equipment, the method comprising the steps of:
    receiving a multi-carrier signal from a far-end multi-carrier endpoint; and
    synchronizing the transmitter of the multi-carrier equipment to the received multi-carrier signal by turning the transmitter on and off.

2. The method of claim 1 wherein the received multi-carrier signal represents a sequence of discrete multi-tone (DMT) symbols and the synchronizing step synchronizes transmission of a sequence of DMT symbols from the transmitter to the received sequence of DMT symbols.

3. The method of claim 2 wherein the synchronization step synchronizes the transmitter such that a received DMT symbol and a transmitted DMT symbol overlap one another in time.

4. The method of claim 1 wherein the received multi-carrier signal represents a sequence of extended discrete multi-tone (DMT) symbols and wherein each extended DMT symbol comprises a cyclic extender and a DMT symbol and wherein the synchronizing step synchronizes transmission of a sequence of extended DMT symbols to the received sequence of extended DMT symbols.

5. The method of claim 4 wherein the synchronization step synchronizes the transmitter such that a received DMT symbol and a transmitted extended DMT symbol overlap one another in time.

6. The method of claim 4 wherein the synchronizing step further includes the step of adjusting the value of these cyclic extenders as a function of a propagation delay.

7. The method of claim 6 wherein the propagation delay is equal to a round trip delay between the multi-carrier equipment and the far-end multi-carrier endpoint.

8. The method of claim 4 wherein the synchronizing step further includes the step of adjusting the value of these cyclic extenders by a fixed value.

9. The method of claim 1 wherein the synchronizing step includes the steps of:
    performing clock recovery on the received multi-carrier signal for recovery of a timing signal; and
    using the recovered timing signal to synchronize transmission.

10. The method of claim 9 wherein the recovered timing signal is an DMT symbol clock.

11. The method of claim 1 wherein the multi-carrier equipment is asynchronous digital subscriber line (ADSL) equipment.

12. A method for use in multi-carrier equipment, the method comprising the steps of:
    adjusting a value of a cyclic extension; and
    synchronizing transmission of a multi-carrier signal with a transmission from a far-end multi-carrier equipment by turning the transmitter on and off, wherein the multi-carrier signal includes the adjusted cyclic extensions.

13. The method of claim 12 wherein the adjusting step includes the steps of:
    measuring a propagation delay associated with multi-carrier communications with the far-end multi-carrier equipment; and
    adjusting the value of the cyclic extension as a function of the measured propagation delay.

14. The method of claim 13 wherein the measuring and adjusting steps are performed during a training phase of a multi-carrier connection and the synchronizing step is performed during a communications phase of the multi-carrier connection.

15. The method of claim 13 wherein the propagation delay is a round trip propagation delay.

16. The method of claim 12 wherein the multi-carrier signal is a sequence of extended discrete multi-tone (DMT) symbols, each extended DMT symbol comprising a DMT symbol and the adjusted cyclic extensions.

17. The method of claim 16 wherein the synchronization step synchronizes the transmitter such that a received DMT symbol and a transmitted extended DMT symbol overlap one another in time.

18. The method of claim 12 wherein the synchronizing step includes the steps of:
    performing clock recovery on a received multi-carrier signal resulting from the transmission of the far-end multi-carrier equipment for recovery of a timing signal; and
    using the recovered timing signal to synchronize transmission.

19. The method of claim 18 wherein the recovered timing signal is a DMT symbol clock.

20. The method of claim 12 wherein the multi-carrier equipment is asynchronous digital subscriber line (ADSL) equipment.

21. Apparatus for use in multi-carrier equipment, the apparatus comprising:
    means for receiving a multi-carrier signal from a far-end multi-carrier endpoint; and
    means for synchronizing the transmitter of the multi-carrier equipment to the received multi-carrier signal by turning the transmitter on and off.

22. The apparatus of claim 21 wherein the received multi-carrier signal represents a sequence of discrete multi-tone (DMT) symbols and the means for synchronizing synchronizes transmission of a sequence of DMT symbols from the transmitter to the received sequence of DMT symbols.

23. The apparatus of claim 22 wherein the means for synchronizing synchronizes the transmitter such that a received DMT symbol and a transmitted DMT symbol overlap one another in time.

24. The apparatus of claim 21 wherein the received multi-carrier signal represents a sequence of extended discrete multi-tone (DMT) symbols and wherein each extended DMT symbol comprises a cyclic extender and a DMT symbol and wherein the means for synchronizing synchronizes transmission of a sequence of extended DMT symbols to the received sequence of extended DMT symbols.

25. The apparatus of claim 24 wherein the means for synchronizing synchronizes the transmitter such that a received DMT symbol and a transmitted extended DMT symbol overlap one another in time.

26. The apparatus of claim 24 wherein the means for synchronizing further adjusts the value of these cyclic extenders as a function of a propagation delay.

27. The apparatus of claim 26 wherein the propagation delay is equal to a round trip delay between the multi-carrier equipment and the far-end multi-carrier endpoint.

28. The apparatus of claim 24 wherein the means for synchronizing further adjusts the value of these cyclic extenders by a fixed value.

29. The apparatus of claim 21 wherein the means for synchronizing a) performs clock recovery on the received multi-tone signal for recovery of a timing signal, and b) uses the recovered timing signal to synchronize transmission.

30. The apparatus of claim 29 wherein the recovered timing signal is a DMT symbol clock.

31. The apparatus of claim 21 further comprising means for echo canceling the received multi-carrier signal, wherein the means for echo canceling includes a plurality of single tap echo cancelers.

32. The apparatus of claim 21 wherein the multi-carrier equipment is asynchronous digital subscriber line (ADSL) equipment.

33. An improved apparatus for use in multi-carrier equipment, the multi-carrier equipment comprising a discrete multi-tone (DMT) modulator and a DMT demodulator, the DMT modulator transmitting a sequence of extended DMT symbols and the DMT demodulator receiving a sequence of extended DMT symbols, each extended DMT symbol comprising a cyclic extender and a DMT symbol, the improvement comprising:

processing circuitry for synchronizing the transmitted sequence of extended DMT symbols to the received extended DMT symbols by turning the DMT modulator on and off.

34. The improvement of claim 33 wherein the processing circuitry measures a propagation delay associated with a far-end multi-carrier equipment and adjusts a value of the cyclic extender as a function of the measured propagation delay.

35. The improvement of claim 34 wherein the propagation delay is equal to a round trip delay between the multi-carrier equipment and the far-end multi-carrier endpoint.

36. The improvement of claim 33 wherein the processing circuitry adjusts a value of the cyclic extender by a fixed amount for maintaining synchronization.

37. The improvement of claim 33 wherein the processing circuitry synchronizes the transmitter such that a received DMT symbol and a transmitted extended DMT symbol overlap one another in time.

38. The improvement of claim 33 further comprising:

clock recovery circuitry for recovery of a timing signal from the received sequence of extended DMT symbols; and wherein the processing circuitry uses the recovered timing signal to synchronize transmission of the transmitted sequence of extended DMT symbols.

39. The improvement of claim 38 wherein the recovered timing signal is a DMT symbol clock.

40. The improvement of claim 33 further comprising a plurality of single tap echo cancelers for echo canceling the received multi-carrier signal.

41. The improvement of claim 33 wherein the multi-carrier equipment is asynchronous digital subscriber line (ADSL) equipment.

42. An improved apparatus for use in a multi-carrier system, the multi-carrier system comprising a far-end multi-carrier endpoint that provides a multi-carrier signal comprising a sequence extended discrete multi-tone (DMT) symbols, each extended DMT symbol comprising a cyclic extender and a DMT symbol, the multi-carrier endpoint including a modulator, the improvement comprising:

a multi-carrier endpoint for receiving the sequence of extended DMT symbols and for synchronizing transmission of its sequence of extended DMT symbols to the received sequence by turning on and off the multi-carrier endpoint modulator.

43. The improvement of claim 42, wherein the multi-carrier endpoint measures a propagation delay associated with the far-end multi-carrier equipment and adjusts a value of the cyclic extender as a function of the measured propagation delay.

44. The improvement of claim 42 wherein the propagation delay is equal to a round trip delay between the multi-carrier endpoint and the far-end multi-carrier endpoint.

45. The improvement of claim 42, wherein the multi-carrier endpoint adjusts a value of the cyclic extender by a fixed amount for maintaining synchronization.

46. The improvement of claim 42 wherein the multi-carrier endpoint synchronizes the transmission such that a received DMT symbol and a transmitted extended DMT symbol overlap one another in time.

47. The improvement of claim 42 wherein the multi-carrier endpoint recovers a timing signal from the received sequence of extended DMT symbols for use in synchronizing transmission of its sequence of extended DMT symbols.

48. The improvement of claim 47 wherein the recovered timing signal is a DMT symbol clock.

49. The improvement of claim 42 wherein the multi-carrier endpoint further comprises a plurality of single tap echo cancelers for echo canceling the received multi-carrier signal.

50. The improvement of claim 42 wherein the multi-carrier equipment is asynchronous digital subscriber line (ADSL) equipment.

51. Apparatus comprising:

a discrete multi-tone (DMT) modulator for transmitting a sequence of extended DMT symbols to a far-end multi-carrier endpoint;

a DMT demodulator for receiving a sequence of extended DMT symbols from the far-end multi-carrier endpoint; and a controller for synchronizing the DMT modulator to the received sequence of extended DMT symbols by turning the DMT modulator on and off.

52. The apparatus of claim 51 wherein each extended DMT symbol comprises a cyclic extender and a DMT symbol, and the controller synchronizes the DMT modulator such that a received DMT symbol and a transmitted extended DMT symbol overlap one another in time.

53. The apparatus of claim 51 wherein the controller further adjusts the value of the cyclic extender as a function of a propagation delay.

54. The apparatus of claim 53 wherein the propagation delay is equal to a round trip delay between the apparatus and the far-end ADSL endpoint.

55. The apparatus of claim 51 wherein the controller further adjusts the value of the cyclic extender by a fixed amount for maintaining synchronization.

56. The apparatus of claim 51 wherein the DMT demodulator provides a timing signal recovered from the received sequence of extended DMT symbols and wherein the controller uses the recovered timing signal to synchronize transmission.

57. The apparatus of claim 56 wherein the recovered timing signal is a DMT symbol clock.

58. The apparatus of claim 51 wherein the multi-carrier signal is an asynchronous digital subscriber line (ADSL) DMT signal.

\* \* \* \* \*